(12) United States Patent
Glud et al.

(10) Patent No.: US 11,719,223 B2
(45) Date of Patent: Aug. 8, 2023

(54) WIND TURBINE BLADE, METHOD OF MANUFACTURING WIND TURBINE BLADE, AND USE OF FABRIC IN COMPOSITE STRUCTURE OF WIND TURBINE BLADE

(71) Applicant: Envision Energy CO., LTD, Jiangsu (CN)

(72) Inventors: Jens Glud, Billund (DK); Giancarlo Girolomini, Coriano (IT); Lars Overgaard, Aalborg (DK)

(73) Assignee: Envision Energy CO., LTD, Jiangsu (CN)

( * ) Notice: Subject to any disclaimer, the term of this patent is extended or adjusted under 35 U.S.C. 154(b) by 219 days.

(21) Appl. No.: 17/433,607

(22) PCT Filed: Apr. 22, 2020

(86) PCT No.: PCT/CN2020/086056
§ 371 (c)(1),
(2) Date: Aug. 25, 2021

(87) PCT Pub. No.: WO2020/216234
PCT Pub. Date: Oct. 29, 2020

(65) Prior Publication Data
US 2022/0154684 A1  May 19, 2022

(30) Foreign Application Priority Data

Apr. 23, 2019  (DK) .............................. PA201970246

(51) Int. Cl.
*F03D 1/06* (2006.01)
*B29C 70/20* (2006.01)
(Continued)

(52) U.S. Cl.
CPC ............ *F03D 1/0675* (2013.01); *B29C 70/20* (2013.01); *B29C 70/443* (2013.01);
(Continued)

(58) Field of Classification Search
CPC ................. F03D 1/0675; F03D 1/0683; F05B 2230/20; F05B 2280/6001;
(Continued)

(56) References Cited

U.S. PATENT DOCUMENTS

| 6,995,099 B1 * | 2/2006 | Nishimura ............. B32B 5/024 |
| | | 442/60 |
| 10,022,907 B2 * | 7/2018 | Bergstrom ............. B29C 70/50 |
| 11,225,942 B2 * | 1/2022 | Riahi ..................... B32B 5/245 |
| 2005/0037678 A1 | 2/2005 | Mack et al. |

(Continued)

FOREIGN PATENT DOCUMENTS

| CN | 101666290 | 3/2010 |
| CN | 102325646 | 1/2012 |
| CN | 102729489 | 10/2012 |

(Continued)

OTHER PUBLICATIONS

"International Search Report (Form PCT/ISA/210) of PCT/CN2020/086056," dated Aug. 6, 2020, pp. 1-2.

*Primary Examiner* — Courtney D Heinle
*Assistant Examiner* — Sang K Kim
(74) *Attorney, Agent, or Firm* — JCIP Global Inc.

(57) ABSTRACT

A turbine blade and a method of manufacturing the wind turbine, wherein the wind turbine blade comprises a composite structure and a surrounding layer. The composite structure comprises a stack of pultruded elements where an infusion-promoting layer is arranged between adjacent pairs of pultruded elements (18). The infusion-promoting layers have a higher permeability than the surrounding layer so that the resin flows at a higher speed within the stacked structure than in the surrounding layer.

12 Claims, 5 Drawing Sheets

(51) Int. Cl.
    *B29C 70/44*     (2006.01)
    *B29C 70/54*     (2006.01)
    *B29D 99/00*     (2010.01)
(52) U.S. Cl.
    CPC ........ *B29C 70/547* (2013.01); *B29D 99/0025*
        (2013.01); *F05B 2230/20* (2013.01); *F05B*
            *2280/6001* (2013.01); *F05B 2280/6003*
                                                 (2013.01)
(58) Field of Classification Search
    CPC ............. F05B 2280/6003; B29C 70/20; B29C
                70/443; B29C 70/547; B29D 99/0025
    See application file for complete search history.

(56) References Cited

U.S. PATENT DOCUMENTS

2008/0277053 A1* 11/2008 Stiesdal ................ B29C 70/547
                                                        156/245
2016/0159998 A1   6/2016 Spencer et al.
2017/0129207 A1*  5/2017 Hallander ............. B29C 70/887

FOREIGN PATENT DOCUMENTS

| CN | 105899348  | 8/2016  |
| CN | 108312575  | 7/2018  |
| WO | 2015096840 | 7/2015  |
| WO | 2015192867 | 12/2015 |
| WO | 2016015736 | 2/2016  |
| WO | 2017108685 | 6/2017  |
| WO | 2017144449 | 8/2017  |
| WO | 2017216155 | 12/2017 |

* cited by examiner

WIND TURBINE BLADE, METHOD OF MANUFACTURING WIND TURBINE BLADE, AND USE OF FABRIC IN COMPOSITE STRUCTURE OF WIND TURBINE BLADE

CROSS-REFERENCE TO RELATED APPLICATION

This application is a 371 of international application of PCT application serial no. PCT/CN2020/086056, filed on Apr. 22, 2020, which claims the priority benefit of Denmark application no. PA201970246, filed on Apr. 23, 2019. The entirety of each of the above mentioned patent applications is hereby incorporated by reference herein and made a part of this specification.

FIELD OF THE INVENTION

The present invention relates to a wind turbine blade comprising a spar cap formed by a stack of pultruded elements, wherein infusion-promoting layers are arranged between adjacent pultruded elements in the stack. The stacked structure is infused with resin in the width direction via a series of inlet channels, where excess resin is led out of the stacked structure via a series of outlet channels.

BACKGROUND OF THE INVENTION

It is known to produce preforms for the manufacture of wind turbine blades, wherein the performs are manufactured using a pultrusion process or an extrusion process. The preforms are subsequently arranged to form a stacked structure, which is then infused with resin to form a blade component, such as the spar cap. Such stacked structures make it difficult to detect any internal defects using non-destructive tests (NDT).

Therefore, infusion-promoting layers may be arranged relative to the stacked structure to control the resin flow around the stacked structure. Further, infusion-promoting layers may be arranged between adjacent preforms to control the resin flow through the stacked structure. The risk of back-filling and dry spots forming in the stacked structure can thus be reduced.

WO 2015/096840 A1 discloses a permeable fibre layer arranged the chordwise edges of the stacked structure and the core element. Resin is introduced through a set of inlet channels and further into the stacked structure via the chordwise edge. The permeable fibre layer has an areal weight of 100-700 gram per square meter (gsm) and restricts the resin flow in spanwise direction and provides a controlled resin flow in chordwise direction.

WO 2016/015736 A1 discloses infusion-promoting layers arranged between adjacent pultruded elements and a further infusion-promoting layer arranged between adjacent stacks of pultruded elements. The infusion-promoting layer is a woven biaxial fibre layer with interlaced twisted yarns. The fibre layer further has an area weight of 100-300 gsm and fibres arranged at 0/90 degrees or at +/−45 degrees. It is stated that the infusion speed through the infusion-promoting layer is selected to match, or is within 5-15%, of the infusion speed of the other blade components.

WO 2018/029240 A1 also discloses infusion-promoting layers arranged between adjacent pultruded elements. Here, the infusion-promoting layer is a unidirectional (UD) fibre layer where the fibres are aligned with the longitudinal direction of the stacked structure. The fibre layer further has an area weight of 800 gsm.

WO 20147/108685 A1 discloses a plurality of flow-promoting strips arranged between adjacent layers of GFRP or CFRP materials. The flow-promoting strips are spaced apart to form internal channels in which the resin is able to flow. The strips are arranged at 90 degrees or 40-45 degrees relative to the longitudinal direction of the stacked structure.

Object of the Invention

An object of the invention is to provide an alternative composite structure and method for controlling the resin flow through the composite structure.

Another object of the invention is to provide a composite structure and method that allows for the use of non-destructive test methods to examine the infusion quality.

Yet another object of the invention is to provide a composite structure and method having improved resin-promoting properties.

DESCRIPTION OF THE INVENTION

An object of the invention is achieved by a wind turbine blade for a wind turbine, comprising:
at least one composite structure having a length, a width and a thickness, the at least one composite structure comprising a plurality of pultruded elements arranged in at least one stacked structure, wherein at least one infusion-promoting layer is arranged between at least two adjacent pultruded elements within the at least one stacked structure, the at least one infusion-promoting layer has a first permeability parameter, $K_1$, in the width direction and further a permeability parameter, $K_2$, in the length direction, wherein $K_2$ is less than $K_1$,
at least one surrounding layer arranged relative to the at least one composite structure, the at least one surrounding layer has a second permeability parameter, $K_{1a}$ in the width direction, characterised in that
$K_1$ is greater than $K_{1a}$, and
wherein a first infusion speed, $V_1$, of a resin through the at least one infusion-promoting layer is greater than a second infusion speed, $V_{1a}$, of the resin through the at least one surrounding layer.

This provides a composite structure having a high resin permeability in the chordwise direction, and thus a high infusion speed in the chordwise direction. The present composite structure has a local infusion speed within the stack which is greater than a local infusion speed of a blade component located adjacent to the composite structure. This ensures a proper infusion of the stacked structure and prevents back-filling of the intermediate layers. This also prevents any potential dry spots from forming internally within the stack, and thus allows the composite structure to be inspected using non-destructive tests.

Here, the term 'intermediate layer' is defined as any layer arranged within the stack. Further, the term 'surrounding layer' is defined as any layer located adjacent to or near one or both edges or sides of the stack. Additionally, the term 'blade component' is defined as an aerodynamic shell or another structural component of the wind turbine blade. The surrounding layer may form part of the composite structure or part of the blade component.

The composite structure comprises a stack of pultruded elements arranged in one or more rows and/or columns. Preferably, all or some of the rows and/or columns has two or more pultruded elements arranged in the width direction and/or in the length direction. The stack has a first side and a second side arranged between a first edge and a second edge, wherein each edge and side extends in the length direction. The number of pultruded elements may thus be adapted to the geometrical dimensions of the wind turbine blade and/or the thickness of the blade shell and spar cap of the wind turbine blade.

The pultruded elements are preferably shaped with rounded corners extending in the longitudinal direction. This reduces the risk of pinching the surrounding layers and/or the intermediate layers, thereby providing a more robust infusion process. Thus, wrinkles are prevented from forming in the surrounding layers and/or in the intermediate layers.

According to one embodiment, the at least one infusion-promoting layer is a fabric with unidirectional fibres.

The applicant has found that an infusion-promoting layer formed by a fabric with unidirectional fibres has a surprising effect on the mechanical properties of the composite structure. The unidirectional fibre fabric provides improved fracture toughness at the interface between the individual pultruded elements in the stacked structure. In example, the interface may have an energy release rate about 1100 J/m². Fracture toughness tests have shown that fibre fabrics with twisted yarns will fail at lower forces.

The fibres may be made of glass, carbon, aramid, metal, polyester or Nylon®. The fabric may thereby have a permeability ($K_1$) in the fibre direction that is higher than the permeability ($K_2$) across the fibre direction. The fabric may thus be used to guide the resin along the fibres during infusion, thereby providing a controlled resin flow. This allows the permeability ratio ($K_1/K_2$) of the fabric to be maximised.

Unlike the woven fibre fabric of HexForce® TF970 mentioned in WO 2016/015736 A1 which is a biaxial fabric with a fibre orientation of 0/90°. The fibres are symmetrically arranged so that they have an equal permeability in both the longitudinal and width directions. This fibre fabric is commonly used in wind turbine blade production.

The fabric may preferably be a non-crimp fabric where the unidirectional fibres are arranged in multiple layers. The multiple layers may be stitched together in the thickness direction using stitching yarns. This provides a fabric with good mechanical properties due to the high fibre straightness. This fabric may further have a higher permeability than that of a crimp fabric. Further, this may allow the fabric to better conform to the shape of the stacked structure due to its excellent drapability.

The fabric may instead be a crimp fabric where the unidirectional fibres are interlaced with weft yarns in one or more layers. The weaving pattern may be selected to provide an optimal tradeoff between the mechanical properties and the fabric integrity. This allows the fabric to have good shear strength and may have a competitive price advantage compared to non-crimp fabrics.

According to one embodiment, the fibres are orientated between 85-95 degrees relative to the length direction.

The fibres may preferably be orientated relative to the length direction of the fabric. The fibres may be orientated between 85 to 95 degrees relative to the length direction, e.g. between 88 to 92 degrees. The fibre direction may be selected to provide the desired flow rate. The high permeability in the width direction promotes the resin to mainly flow in that direction.

According to one embodiment, the fabric comprises untwisted yarns.

The fabric may advantageously comprise untwisted yarns, which has the surprising effect of providing an improved resin flow compared to twisted yarns. This in turn promotes the fibre bridging and leads to improved mechanical properties of the interface between two adjacent pultruded elements. This reduces the spacing between adjacent pultruded elements compared to the twisted yarns of WO 2016/015736 A1.

The applicant has found that the effects of using unidirectional fibres can be further improved by using untwisted yarns. Thus the use of unidirectional fibres and twisted yarns has an increased combined effect.

According to one embodiment, the at least one promoting layer has an areal weight of 50-300 gram per square meter.

The infusion-promoting layer may be select so that it has an areal weight between 50-300 gram per square meter (gsm), preferably between 100-200 gsm, e.g. between 150-180 gsm. This provides an optimal resin infusion through the intermediate layers. Commercial available unidirectional glass fabrics have an area weight well above 300 gsm, thus making them unsuited for use as resin-promoting layers due to their high areal weight.

According to one embodiment, the at least one infusion-promoting layer further has a third permeability parameter, $K_3$, in the thickness direction, wherein $K_1$ is greater than $K_3$.

The stacked structure may comprise one or more infusion-promoting layers extending in the thickness direction between adjacent pultruded elements or adjacent stacks of pultruded elements. Alternatively, one or more of the infusion-promoting layers may extend partly in the thickness direction and partly in the width direction. The infusion-promoting layers may further a permeability parameter, $K_3$, in the thickness direction, wherein $K_3$ is less than $K_1$. This reduces the local infusion speed in the thickness direction, and reduces the risk of back-filling.

Alternatively or additionally, the stacked structure may comprise one or more infusion-promoting layers extending in the length direction between adjacent pultruded elements in one or more stacks. Alternatively, one or more of the infusion-promoting layers may extend partly in the length direction and/or partly in the width direction. The infusion-promoting layers may further a permeability parameter, $K_2$, in the length direction, wherein $K_2$ is less than $K_1$. This further allows for a controlled resin flow in the length direction.

Further, one or more surrounding layers may extend, partly or fully, in the width direction and/or in the length direction. In example, the surrounding layers may be arranged on the first and/or second sides of the stack. Alternatively, one or more surrounding layers may extend, partly or fully, in the width direction and/or in the thickness direction. In example, the surrounding layers may be arranged on the first and/or second edge of the stack. In example, the surrounding layers may be arranged on the second side and further on the first and second edges of the stack. In example, the surrounding layers may surround or enclose the stack in the width plane and extend partly or fully along the length of the stack. The surrounding layers may act as resin distribution layers during the infusion process.

The surrounding layers may further a permeability parameter, $K_{2a}$, in the length direction, and a permeability parameter, $K_{3a}$, in the thickness direction. Preferably, the permeability parameter, $K_{2a}$, of the surrounding layer is less than the permeability parameter, $K_1$, of the infusion-promoting layer. Further, the permeability parameter, $K_{3a}$, of the surrounding layer is less than the permeability parameter, $K_3$, of the infusion-promoting layer. This may ensure that the stacked structure is infused properly so that internal dry spots or air pockets are avoided.

According to one embodiment, a local width of the at least one infusion-promoting layer corresponds to a local width of the at least one stacked structure or one pultruded element.

The width and/or length of each infusion-promoting layer may be adapted to the geometrical dimensions and shape of the composite structure and/or of the wind turbine blade.

In example, the infusion-promoting layer may have a local width corresponding to the width of a pultruded element or a row of pultruded elements. This allows the infusion-promoting layer to extend the entire width of the stack. Similarly, the infusion-promoting layer may have a local length corresponding to the length of a pultruded element or an array of pultruded elements. This allows the infusion-promoting layer to extend the entire length of the stack.

In example, the infusion-promoting layer may extend along one or more pultruded elements in the width direction and further extend along a column of pultruded elements in the thickness direction. The local width of the infusion-promoting layer may thus be adapted to the width and thickness of the stacked structure.

The pultruded elements may be aligned in rows and columns within the stacked structure. Alternatively, the pultruded elements may be arranged in a zig-zag pattern within the stacked structure. Alternatively, the pultruded elements may be offset relative to each other to form a composite structure with a parallelogram or trapezoid-shaped cross-sectional profile.

According to one embodiment, the at least one surrounding layer forms part of the composite structure or an aerodynamic shell of the wind turbine blade.

The surrounding layer may be arranged on the first and/or second side of the composite structure. In example, a first resin distribution layer may be arranged on the first side after lay-up or placement of the composite structure. Further, a second resin distribution layer may be arranged in a recess of the aerodynamic shell so that it faces the second side of the composite structure. This allows the resin to be distributed over the composite structure during the infusion process.

Alternatively, additional infusion-promoting layers may extend partly or fully around the stacked structure. The additional infusion-promoting layers may form projecting flanges which are positioned on an inner surface of the aerodynamic shell. This allows for a controlled resin flow around the stacked structure.

Alternatively, the stack may comprise a number of surrounding layers arranged at the first side of the stack. The stack may further comprise a number of surrounding layers arranged at the second side of the stack. These surrounding layers may act as the inner and/or outer skin of the composite structure. An infusion-promoting layer may be arranged between the outer skin and an outermost row of pultruded elements. An infusion-promoting layer may further be arranged between the inner skin and an innermost row of pultruded elements.

According to one embodiment, the composite structure forms a spar cap of the wind turbine blade.

The present composite structure may advantageously be a spar cap, but may also form part of another structural component of the wind turbine blade, e.g. the shear webs.

An object of the invention is also achieved by a method of manufacturing a wind turbine blade, comprising:
providing a plurality of pultruded elements
further providing at least one surrounding layer, the at least one surrounding layer has a second permeability parameter, $K_{1a}$, in the width direction,
arranging the plurality of pultruded elements in at least one stacked structure, wherein at least infusion-promoting layer is arranged between adjacent pultruded elements within the at least one stacked structure, the at least one infusion-promoting layer has a first permeability parameter, $K_1$, in the width direction and further a permeability parameter, $K_2$, in the length direction, wherein $K_2$ is less than $K_1$,
introducing resin into the at least one stacked structure and the at least one surrounding layer using an infusion process,
curing the at least one stacked structure with resin to form a composite structure, the composite structure having a length, a width and a thickness,
characterised in that $K_1$ is greater than $K_{1a}$, so that the resin flows through the at least one infusion-promoting layer at a first infusion speed, $V_1$, and further through the at least one surrounding layer at a second infusion speed, $V_{1a}$, wherein $V_1$ is greater than $V_{1a}$.

The present method allows resin to flow faster through the intermediate layers of the stacked structure than in the surrounding layers, thus reducing the risk of back-filling and dry spots forming internally in the stacked structure. This allows for a non-destructive testing of the composite structure.

Resin is introduced into the inlet channels at a predetermined infusion speed and then distributed over the composite structure. The resin then flows internally through the stacked structure via the intermediate layers and further around the stacked structure. The permeability of the composite structure means the resin flows faster through the stacked structure than around the stacked structure. This ensures a proper infusion of the stacked structure.

According to one embodiment, the resin is introduced in a chordwise direction.

After lay-up of the stacked structure, the inlet channels may be arranged on the stacked structure and/or on the aerodynamic shell. The inlet channels may extend in the length direction and allow for the resin to be introduced into the stacked structure in the width direction. This allows for a simpler and faster infusion process.

The present invention may suitably be used to introduce different types of resin, such as epoxy, polyester, vinylester or polyurethane.

According to one embodiment, the plurality of pultruded elements and infusion-promoting layers are laid up in a blade mould or in a separate mould, and cured when placed in the blade mould or separate mould.

The present composite structure may be manufactured directly in the blade mould where the pultruded elements and infusion-promoting layers are laid up in a recess in the aerodynamic shell. The stacked structure may then be infused together with the rest of the aerodynamic shell in one step, and set to cure. This allows the composite structure to be integrated into the aerodynamic shell.

Alternatively, the pultruded elements and infusion-promoting layers may be laid up in a separate mould, wherein resin may be introduced into the stacked structure. The stacked structure with resin may then be set to cure to form the composite structure. The cured composite structure may then be lifted into position and bonded to the aerodynamic shell using adhesive or resin infusion. This allows the composite structure to be manufactured separately from the blade mould.

Alternatively, the dry stacked structure may be lifted into position on the aerodynamic shell, and may then be infused with resin. The stacked structure with resin may be set to cure. This allows the composite structure to be infused when placed in the blade mould.

An object of the invention is further achieved by the use of a fabric with unidirectional glass fibres, preferably with untwisted yarns, as a resin-promoting layer in a composite structure of a wind turbine blade.

The applicant has found that the internal infusion speed within the composite structure can be significantly increased compared to conventional resin-promoting layers, such as mentioned in WO 2016/015736 A1. This has the advantageous effect of enabling the composite structure to be infused faster than the surrounding layers, thereby ensuring that the composite structure is properly infused.

The applicant has also found that the resin flow in the unidirectional glass fabric can be further improved by using untwisted yarns. The use of untwisted yarns also enables the composite structure to have a higher fracture toughness compared to conventional twisted glass fibre fabrics, such as HexForce® TF970.

DESCRIPTION OF THE DRAWING

The invention is described by example only and with reference to the drawings, wherein.

In the following text, the figures will be described one by one, and the different parts and positions seen in the figures will be numbered with the same numbers in the different figures. Not all parts and positions indicated in a specific figure will necessarily be discussed together with that figure.

DETAILED DESCRIPTION OF THE INVENTION

Figure 1:
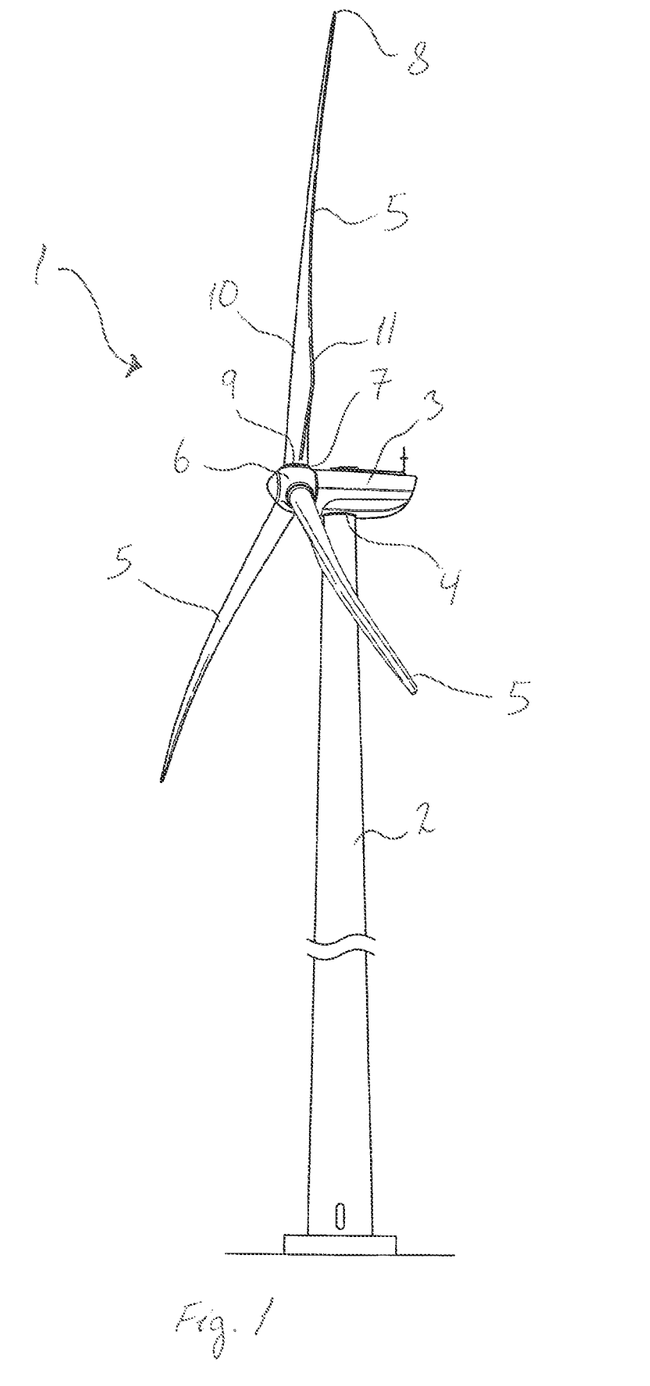
FIG. 1 shows an exemplary embodiment of a wind turbine.

FIG. 1 shows a wind turbine 1 comprising a wind turbine tower 2 and a nacelle 3 arranged on top of the wind turbine tower 2 using a yaw mechanism 4. The yaw mechanism 4 is configured to yaw the nacelle 3 into a yaw angle. A rotor comprising at least two wind turbine blades 5 mounted to a rotor hub 6 via a pitch mechanism 7. The pitch mechanism 7 is configured to pitch the wind turbine blades 5 into a pitch angle. The rotor hub 6 is rotatably connected to a generator arranged in the wind turbine 1 via a rotor shaft.

Each wind turbine blade 5 comprises a tip end 8 and a blade root 9, wherein the wind turbine blade 5 has an aerodynamic profile defining a leading edge 10 and a trailing edge 11.

Figure 2:
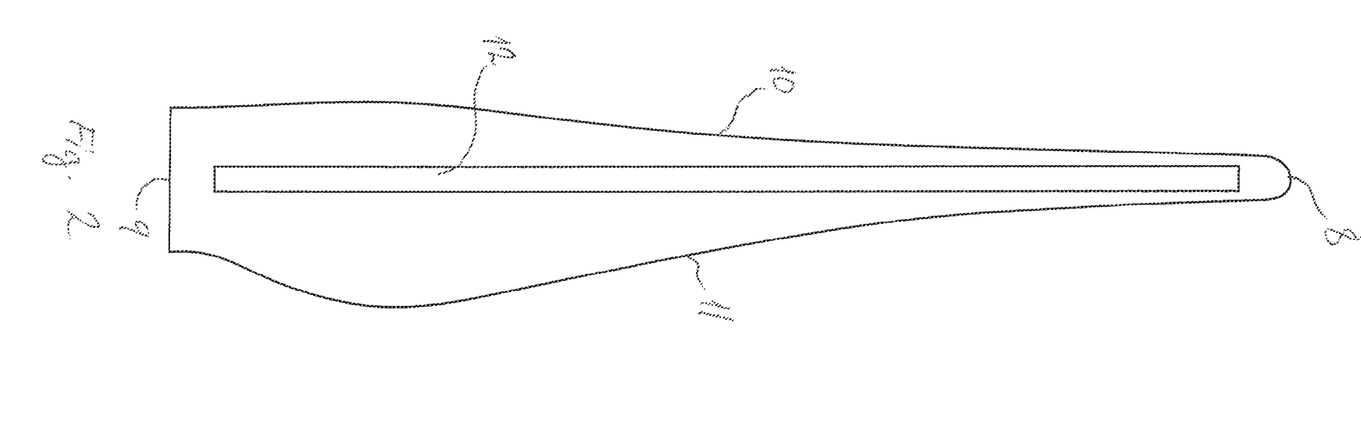
FIG. 2 shows a first embodiment of the wind turbine blade.

FIG. 2 shows a first embodiment of the wind turbine blade 5 where the wind turbine blade 5 is shaped as a full-span blade. The wind turbine blade 5 comprises a spar cap 12 extending from a local first end towards the root end 9 to a local second end towards the tip end 8.

Figure 3:
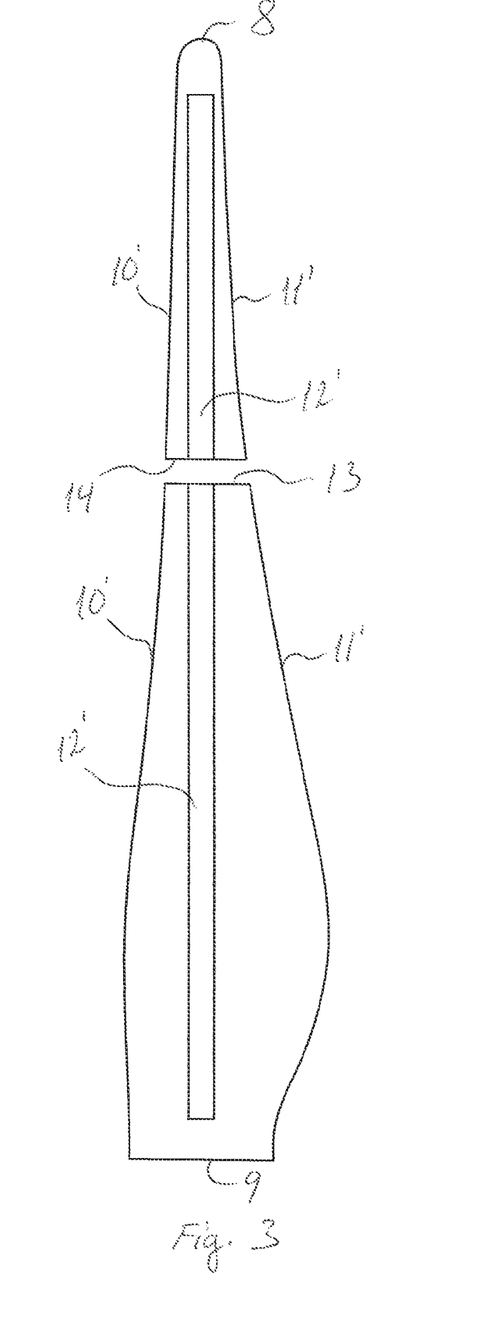
FIG. 3 shows a second embodiment of the wind turbine blade.

FIG. 3 shows a second embodiment of the wind turbine blade 5 where the wind turbine blade 5 is shaped as a modular blade. The wind turbine blade 5 comprises an inner blade section extending from a first end, e.g. the blade root 9, to a second end 13 and further from a leading edge 10' to a trailing edge 11'. The wind turbine blade 5 further comprises an outer blade section extending from a first end 14 to a second end, e.g. the tip end 8 and further from a leading edge 10' to a trailing edge 11'.

Similarly, the spar cap 12' is split into an inner part arranged in the inner blade section and an outer part arranged in the outer blade section. The two blade sections, incl. the spar cap 12' parts, are joined at the interface defined by the first and second ends 13, 14.

The wind turbine blade 5 may also be shaped as a partial-pitch blade where the pitch mechanism 7 is arranged at the second end 13. In this configuration, the pitch mechanism 7 is configured to pitch the outer blade section relative to the inner blade section.

Figure 4:
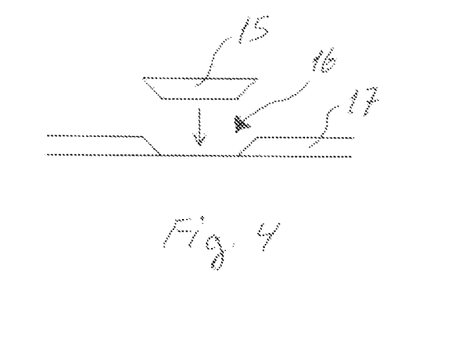
FIG. 4 shows a first embodiment of the composite structure.

FIG. 4 shows a first embodiment of the spar cap 12, 12' formed by a composite structure 15. Here, the composite structure 15 is manufactured in a separate mould (not shown) and then positioned in a recess 16 in an aerodynamic shell 17 of the wind turbine blade 5. The composite structure 15 is subsequently bonded to the aerodynamic shell 17 using an adhesive or resin infusion.

Here, the composite structure 15 and aerodynamic shell 17 are illustrated as having no curvature in the width direction. However, the composite structure 15 and aerodynamic shell 17 may both be curved in the width direction.

Figure 5:
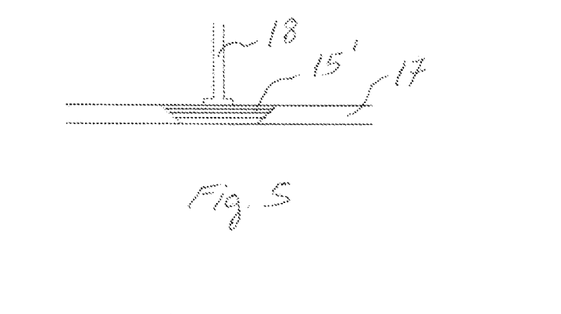
FIG. 5 shows a second embodiment of the composite structure.

FIG. 5 shows a second embodiment of the composite structure 15' which is manufactured directly in the recess 16 of the aerodynamic shell 17. Here, a stacked structure is laid up in the recess 16, and then infused with resin. The stacked structure with resin is then set to cure to bond the composite structure 15' to the aerodynamic shell 17.

A structural component in the form of a shear web 18 is subsequently arranged on the spar cap 12, e.g. the composite structure 15'.

Figure 6:
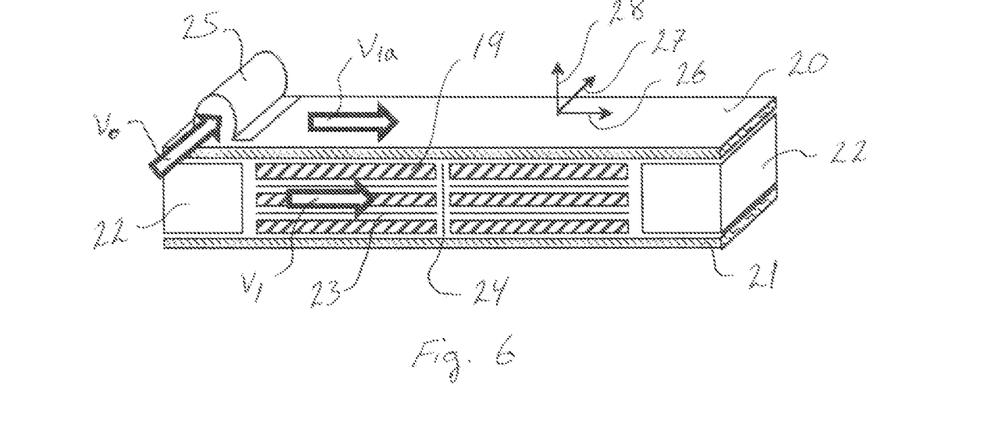
FIG. 6 shows the composite structure and aerodynamic shell during resin infusion.

FIG. 6 shows the composite structure 15 and aerodynamic shell 17 during the resin infusion. Here, a stack of six pultruded elements 19 is shown.

A number of fibre layers forms an inner skin 20 of the wind turbine blade 5. Further, a number of fibre layers forms an outer skin 21 of the wind turbine blade 5. A plurality of core elements 22 is arranged between the inner and outer skins 20, 21 to a sandwich structure.

The stack is arranged between the core elements 22, as illustrated in FIG. 6, to form an integrated composite structure. A plurality of infusion-promoting layers 23, 24 is arranged between adjacent pultruded elements 19. Here, some of the infusion-promoting layers 23 extend in the width direction 26 and have a local width that corresponds to the width of a pultruded element 19. Other infusion-promoting layers 24 extend in the thickness direction 28 and have a local width corresponding to the thickness of the stack.

The composite structure 15, e.g. the pultruded elements 19 and the infusion-promoting layers, further extends in the length direction 27, as illustrated in FIG. 6.

The infusion-promoting layers 23, 24 have a permeability parameter, $K_1$, in the width direction, a permeability parameter, $K_2$, in the length direction, and a permeability parameter, $K_3$, in the thickness direction.

Resin is fed into a series of inlet channels 25 arranged on the aerodynamic shell 17 and, optionally, on the composite structure 15. The resin is fed into the inlet channels 25 at a feeding speed, $V_0$. The resin is then introduced into the aerodynamic shell 17 and further into the composite structure 15 in the width direction.

The resin flows through the infusion-promoting layers 23, and thus the stacked structure, at an infusion speed, $V_1$. The resin further flows through the surrounding layers, e.g. the inner skin 20, at an infusion speed, $V_{1a}$. In this configuration, the infusion speed $V_1$ is greater than the infusion speed $V_{1a}$ which ensures that the stacked structure is infused properly.

Figure 7:
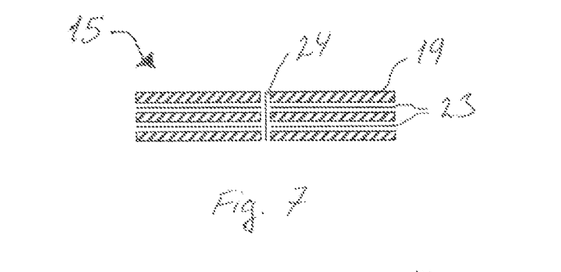
FIG. 7 shows the first embodiment of the composite structure.

FIG. 7 shows the first embodiment of the composite structure 15 where the pultruded elements 19 are arranged in a rows and columns. An infusion-promoting layer 23 is arranged between adjacent pultruded elements 19 in each column. Further, an infusion-promoting layer 24 is arranged between adjacent columns of pultruded elements 19.

Figure 8:
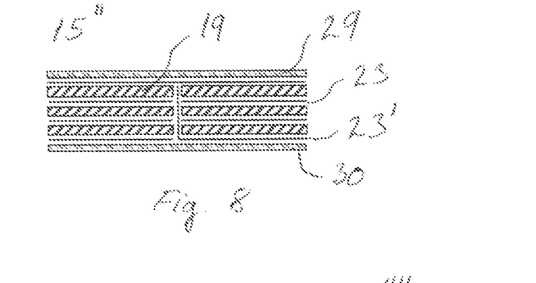
FIG. 8 shows a second embodiment of the composite structure.

FIG. 8 shows a second embodiment of the composite structure 15" where an inner skin 29 is arranged on a first side of the stack of pultruded elements 19. Further, an outer skin 30 is arranged on a second side of the stack of pultruded elements 19. The inner and outer skins 29, 30 each comprise a number of fibre layers extending in the width direction and further in the length direction.

A further infusion-promoting layer 23 is arranged between the inner skin 29 and the stack. Similarly, a further infusion-promoting layer 23 may be arranged between the outer skin 30 and the stack. Here, an infusion-promoting layer 23 is arranged between one column of the stack and the outer skin 30 while another infusion-promoting layer 23' is arranged between the other column of the stack and the outer skin 30. This infusion-promoting layer 23' further extends in the thickness direction between the two columns of pultruded elements 19.

Figure 9:
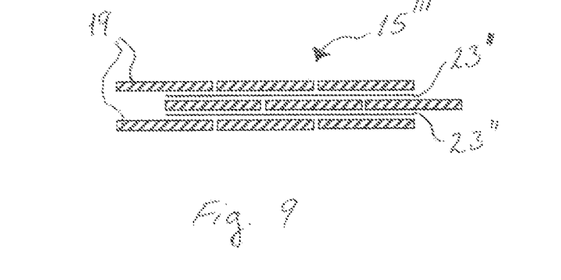
FIG. 9 shows a third embodiment of the composite structure.

FIG. 9 shows a third embodiment of the composite structure 15''' where the pultruded elements 19 are arranged in a zig-zag pattern. A second row of pultruded elements 19 is offset relative to a first and a third row of pultruded elements, as illustrated in FIG. 9. The infusion-promoting layers 23" extend along the entire width of a row of pultruded elements 19 to ensure a proper resin infusion of the composite structure.

Figure 10:
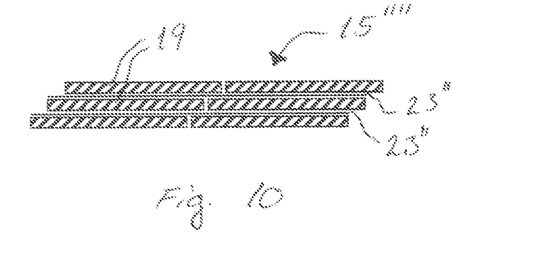
FIG. 10 shows a fourth embodiment of the composite structure.

FIG. 10 shows a third embodiment of the composite structure 15"" where the pultruded elements 19 are arranged in an offset pattern. A second row of pultruded elements 19 is offset relative to a first row of pultruded elements. A third row of pultruded elements 19 is further offset relative to the second row of pultruded elements, and so forth, as illustrated in FIG. 9. The infusion-promoting layers 23''' extends along the entire width of a row of pultruded elements 19 to ensure a proper resin infusion of the composite structure.

Figure 11:
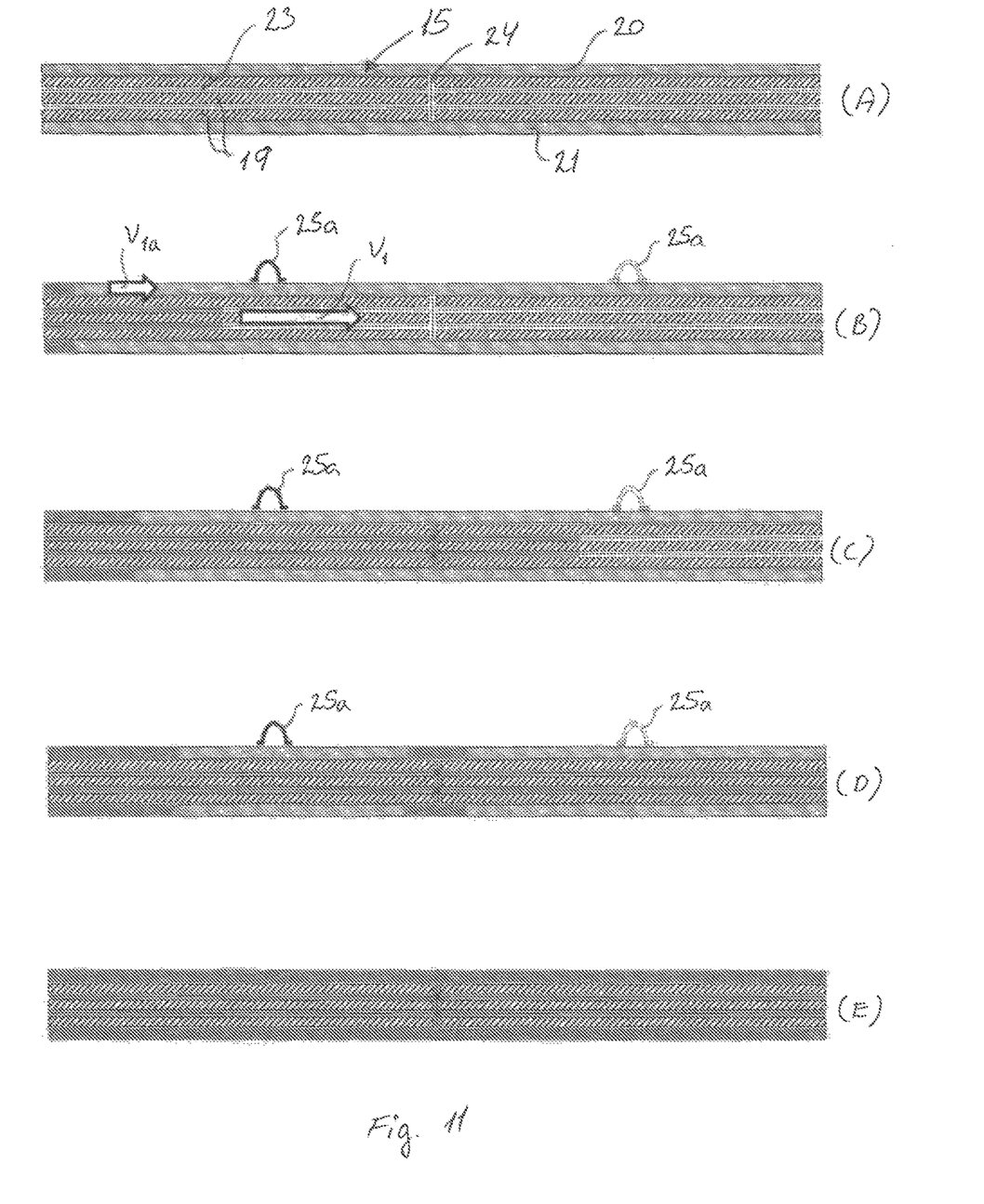
FIGS. 11a-e show the resin flow through the composite structure during the infusion process.

FIGS. 11a-e show the resin flow through the composite structure 15 and the aerodynamic shell 17 during the infusion process. FIG. 11a shows a cross-section of the composite structure 15 arranged between upper fibre layers and lower fibre layers of the wind turbine blade 5 after completion of the lay-up process.

Here, the lower fibre layers are formed at least the outer skin 21 of the aerodynamic shell 17. The upper fibre layers are formed by the inner skin 20 extending over the composite structure 15. Alternatively, the upper fibre layers may be formed by additional fibre layers extending over the top of the composite structure 15 and further along a portion of the inner skin 20 on both sides of the composite structure 15.

Inlet channels and outlet channels are afterwards positioned on the inner surface and the entire structure is encapsulated in a vacuum bag by sealing off the various edges. A resin infusion system is then coupled to the respective inlets and outlets and air is evacuated from the enclosed space.

For illustrative purposes, only one outlet channel 25a is illustrated in FIGS. 11b-d. Optionally, more than one outlet channel 25a may be positioned above the composite structure as indicated by the dashed lines.

Resin is introduced from the side edge in the chordwise direction, as illustrated in FIG. 11b. During infusion, the front of the resin flow will faster within the composite structure 15 than in the lower and upper fibre layers, as illustrated in FIGS. 11b-d. The permeability parameter, $K_1$, of the infusion-promoting layers 23 is higher than the permeability parameter, $K_{1a}$, of the lower and upper fibre layers, therefore the internal infusion speed, $V_1$, is greater than the external infusion speed, $V_{1a}$, as illustrated in FIG. 11b.

When the resin front reaches the resin-promoting layer 24 between stacks or columns of pultruded elements 19, the resin additionally flows in the thickness direction along the resin-promoting layer 24 while continuing to flow in the chordwise direction. Resin will then enter the lower and upper fibre layers at the interface between the stacks or columns and begin to flow in opposite chordwise directions, as illustrated in FIG. 11d. Excess resin will then enter the outlet channel 25a from opposite sides.

Similarly, when the resin front reaches the opposite side edge of the composite structure 15, the resin will flow in the thickness direction. Resin will then enter the lower and upper fibre layers at the side edge and begin to flow in the opposite chordwise direction towards the outlet channel 25a. The resin may also continue flowing along the inner and outer skins 20, 21 to an outlet channel (not shown) on the aerodynamic shell 17.

This prevents dry spots from forming in the fibre laminate and ensures that the composite structure 15 is correctly infused with resin. FIG. 11e shows the composite structure 15 and the lower and upper fibre layers after infusion. Here, the inlet and outlet channels as well as the vacuum bag are omitted for illustrative purposes. The infused structure is then set to cure.

Figure 12:
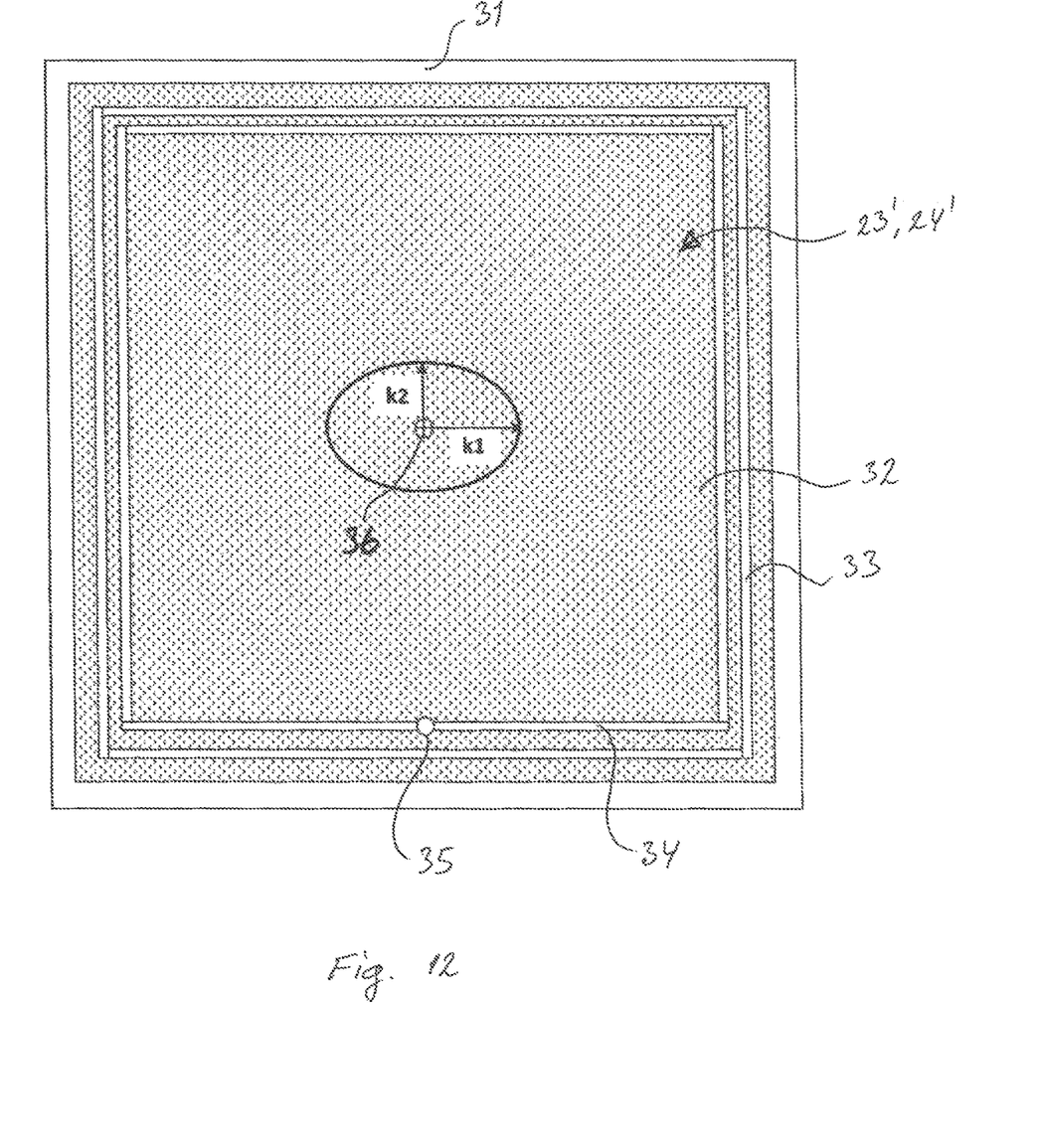
FIG. 12 shows a test setup for determining the permeability parameters of the infusion-promoting layer.

FIG. 12 shows a test setup for determining the permeability parameters of the infusion-promoting layer 23, 24. Here, the test setup is configured to determine in-plane the first and second permeability parameters, $k_1$ and $k_2$, of the infusion-promoting layer 23, 24.

A test sample 23', 24' of the infusion-promoting layer 23, 24 is arranged on a substrate 31, e.g. a glass plate or tray. A lid or cover 32 is placed on top of the test sample 23', 24' and the spacing between the substrate 31 and the cover 32 is sealed off by means of a seal 33. A vacuum channel 34 is arranged within the enclosed spacing and connected to an outlet 35 for evacuating the enclosed spacing.

Resin is then introduced into the test sample 23', 24' via an inlet 36, e.g. at the centre of the test sample 23', 24'. The permeability of the test sample 23', 24' is then measured in-plane using standardised measuring techniques. The first and second permeability parameters, $k_1$ and $k_2$, in the respective directions are then determined based on the measurements, as illustrated in FIG. 12.

Test results have surprisingly shown that the present glass fibre fabric with untwisted yarns has an improved resin flow over conventional glass fibre fabrics with twisted yarns. Furthermore, the test results have also surprisingly shown that the present unidirectional fabric has an improved resin flow over conventional biaxial fabrics. The tests have surprisingly shown that the best result is achieved by the combination of a unidirectional glass fibre fabric with untwisted yarns.

The invention claimed is:

1. A wind turbine blade for a wind turbine, comprising:
at least one composite structure having a length, a width and a thickness, the at least one composite structure comprising a plurality of pultruded elements arranged in at least one stacked structure, wherein at least one infusion-promoting layer is arranged between at least two adjacent pultruded elements within the at least one stacked structure, the at least one infusion-promoting layer has a first permeability parameter, $K_1$, in a width direction and further has a permeability parameter, $K_2$, in a length direction, wherein $K_2$ is less than $K_1$,
at least one surrounding layer arranged relative to the at least one composite structure, the at least one surrounding layer has a second permeability parameter, $K_{1a}$ in the width direction,
$K_1$ is greater than $K_{1a}$, and
wherein a first infusion speed, $V_1$, of a resin through the at least one infusion-promoting layer is greater than a second infusion speed, $V_{1a}$, of the resin through the at least one surrounding layer.

2. The wind turbine blade according to claim 1, wherein the at least one infusion-promoting layer is a fabric with unidirectional fibres.

3. The wind turbine blade according to claim 2, wherein the fibres are orientated between 85-95 degrees relative to the length direction.

4. The wind turbine blade according to claim 2, wherein the fabric comprises untwisted yarns.

5. The wind turbine blade according to claim 1, wherein the at least one infusion-promoting layer has an areal weight of 50-300 gram per square meter.

6. The wind turbine blade according to claim 1, wherein the at least one infusion-promoting layer further has a third permeability parameter, $K_3$, in a thickness direction, wherein $K_1$ is greater than $K_3$.

7. The wind turbine blade according to claim 1, wherein a local width of the at least one infusion-promoting layer corresponds to a local width of the at least one stacked structure or one pultruded element.

8. The wind turbine blade according to claim 1, wherein the at least one surrounding layer forms part of the composite structure or an aerodynamic shell of the wind turbine blade.

9. The wind turbine blade according to claim 1, wherein the composite structure forms a spar cap of the wind turbine blade.

10. A method of manufacturing a wind turbine blade, comprising:
providing a plurality of pultruded elements,
further providing at least one surrounding layer, wherein the at least one surrounding layer has a second permeability parameter, $K_{1a}$, in a width direction,
arranging the plurality of pultruded elements in at least one stacked structure, wherein at least the infusion-promoting layer is arranged between adjacent pultruded elements within the at least one stacked structure, the at least one infusion-promoting layer has a first permeability parameter, $K_1$, in the width direction and further has a permeability parameter, $K_2$, in a length direction, wherein $K_2$ is less than $K_1$,
introducing resin into the at least one stacked structure and the at least one surrounding layer using an infusion process, and
curing the at least one stacked structure with resin to form a composite structure, the composite structure having a length, a width and a thickness,
wherein $K_1$ is greater than $K_{1a}$, so that the resin flows through the at least one infusion-promoting layer at a first infusion speed, $V_1$, and further through the at least one surrounding layer at a second infusion speed, $V_{1a}$, wherein $V_1$ is greater than $V_{1a}$.

11. The method according to claim 10, wherein the resin is introduced in a chordwise direction.

12. The method according to claim 10, wherein the plurality of pultruded elements and infusion-promoting layers are laid up in a blade mould or in a separate mould, and cured when placed the blade mould or separate mould.

* * * * *